US006397993B1

(12) United States Patent
Sommer

(10) Patent No.: US 6,397,993 B1
(45) Date of Patent: Jun. 4, 2002

(54) PRESS DRIVE WITH OIL SHEAR CLUTCH/ BRAKE UNITS

(75) Inventor: Gordon M. Sommer, Plymouth, MI (US)

(73) Assignee: Midwest Brake Bond Company, Warren, MI (US)

(*) Notice: Subject to any disclaimer, the term of this patent is extended or adjusted under 35 U.S.C. 154(b) by 0 days.

(21) Appl. No.: 09/685,370

(22) Filed: Oct. 10, 2000

(51) Int. Cl.[7] .......................... F16D 67/04; F16D 13/74
(52) U.S. Cl. ................................ 192/18 A; 192/113.34
(58) Field of Search .......................... 192/18 A, 113.34, 192/70.12

(56) References Cited

U.S. PATENT DOCUMENTS 3,182,776 A 5/1965 Sommer
3,614,999 A 10/1971 Sommer
3,696,898 A 10/1972 Sommer
3,713,517 A 1/1973 Sommer
3,946,840 A 3/1976 Sommer
4,051,933 A * 10/1977 Beneke et al. ............ 192/18 A
4,562,907 A * 1/1986 Maeda ..................... 192/18 A
4,693,350 A 9/1987 Sommer
5,190,129 A 3/1993 Sommer
5,195,623 A 3/1993 Sommer
5,487,456 A 1/1996 Sommer
5,657,843 A 8/1997 Sommer
5,769,187 A 6/1998 Sommer
5,806,641 A 9/1998 Sommer
5,913,394 A * 6/1999 Kreisl et al. .............. 192/18 A
5,921,361 A 7/1999 Sommer
5,947,244 A 9/1999 Sommer
5,988,326 A 11/1999 Sommer
6,029,786 A 2/2000 Sommer
6,095,298 A * 8/2000 Burns et al. .............. 192/18 A
6,321,646 B1 * 11/2001 Daniel ............... 192/113.34 X

FOREIGN PATENT DOCUMENTS

JP 54-99852 * 8/1979

* cited by examiner

*Primary Examiner*—Rodney H. Bonck
(74) *Attorney, Agent, or Firm*—Harness, Dickey & Pierce, PLC

(57) ABSTRACT

A drive unit for a press uses an oil shear brake and an oil shear clutch which are located axially along the output member of the drive unit. A single piston moves between a brake applied/clutch disengaged position to a brake released/ clutch engaged position under the influence of a hydraulic pressure. Cooling and lubrication oil is provided to the drive unit through the output member and lubricating oil is received from the drive member through a stationary support member.

14 Claims, 2 Drawing Sheets

PRESS DRIVE WITH OIL SHEAR CLUTCH/ BRAKE UNITS

FIELD OF THE INVENTION

The present invention relates to press drives. More particularly, the present invention relates to a single speed, hydraulic actuated press drive which utilizes an oil shear clutch unit, an oil shear brake unit and a single piece hydraulically actuated actuator which simultaneously operates both the clutch unit and the brake unit.

BACKGROUND OF THE INVENTION

Press drives having dry friction clutch/brake units depend on the rubbing of a dry friction material against dry reaction members to start and stop the press. This dry friction rubbing causes wear of both the friction material and the reaction members as well as the generation of heat. The faster the press operates and/or the faster the flywheel rotates, the greater the wear and heat generated. This generation of wear and heat requires periodic gap adjustments between the dry friction material and the dry reaction members to keep the press operating correctly.

Some dry friction clutch units and brake units in press drives are mechanically interlocked. Mechanical interlocking of the dry friction clutch and the brake units means that a single piston first releases the brake and then engages the clutch for starting of the press. For stopping the press, the clutch is first released and then the brake is applied by the piston. These mechanically interlocked units have a significant portion of the mass of the clutch and brake units mounted on the drive shaft and this can represent as much as 80% of the total inertial of the press that the press drive must stop and start. Mechanical interlocking of the dry friction clutch and brake units reduces the frequency required for gap adjustments because the two units are never simultaneously engaged, but mechanical interlocking does not eliminate this adjustment procedure. Adjustment for these dry friction units is still necessary when the gap has increased to the point that the response of the press is adversely affected.

Press drive builders have introduced lower inertia clutch and brake designs in an effort to reduce the start-stop inertia and thus increase the useful life of these drives. These low inertia designs typically require separate pistons to release the brake and engage the clutch. The start-stop inertia with these designs has been reduced to approximately 60% of the total inertia. In order for the press drive to function correctly, the separate pistons must be properly synchronized to prevent overlap of the clutch and brake units. When the clutch starts to engage before the brake is fully released, or, when the brake starts engaging before the clutch is fully disengaged, excessive heat is generated and wear of the friction material and the reaction member is greatly increased. Conversely, if there is too much time between the engage/release of the clutch/brake, drifting occurs resulting in sluggish operation and if the drift is high enough, it can result in unsafe operation of the press.

In addition to the issues discussed above, the trip rate for a press equipped with a dry friction clutch/brake unit in the press drive is limited because the mass of the unit determines its heat capacity. If the mass is increased to increase its heat capacity, the inertia that must be stopped and started is increased. These two factors define a closed loop from which it is impossible to escape when trying to increase the performance of the system.

The continued development of press drives includes the development of clutch and brake units which address the problems associated with dry friction clutch and brake units, the high inertia associated with clutch and brake units and the synchronization for the operation of the clutch and brake units.

SUMMARY OF THE INVENTION

The present invention provides the art with a press drive system which uses oil shear brake and clutch drives. The entire system uses hydraulic actuation instead of air actuation. The clutch and brake units are arranged axially along the output shaft to minimize the outer size of the unit and thus reduce the inertia of the system. The clutch and brake units are mechanically interlocked using a single piece piston that moves in response to the presence of pressurized hydraulic fluid.

The oil shear design for the clutch and brake units offers the advantage of little or no wear for the friction material and the reaction members. In addition, the oil shear design does not have the problem of brake fade. This provides a more precise operation of the press and dramatically increases press up-time. The oil film within these oil shear units carries the heat generated by start-stops away from the friction material and the reaction members. This removal of heat offers the advantage that there is now no practical limit for the press trip rate and flywheel speed, plus it provides unlimited inching capabilities.

The clutch and brake units of the present invention utilize a disc stack of multiple discs. These multiple disc surfaces can be used to greatly reduce the clutch/brake inertia thereby allowing the mechanical interlocking of the clutch and brake units without inertia penalty. In addition, the axial positioning of these two units also helps in the reduction of the clutch/brake inertia.

Finally, the mechanical interlocking of the clutch and brake units completely eliminates the need for any gap adjustment since the friction material and the reaction members experience little or no wear.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENTS

Figure 1:
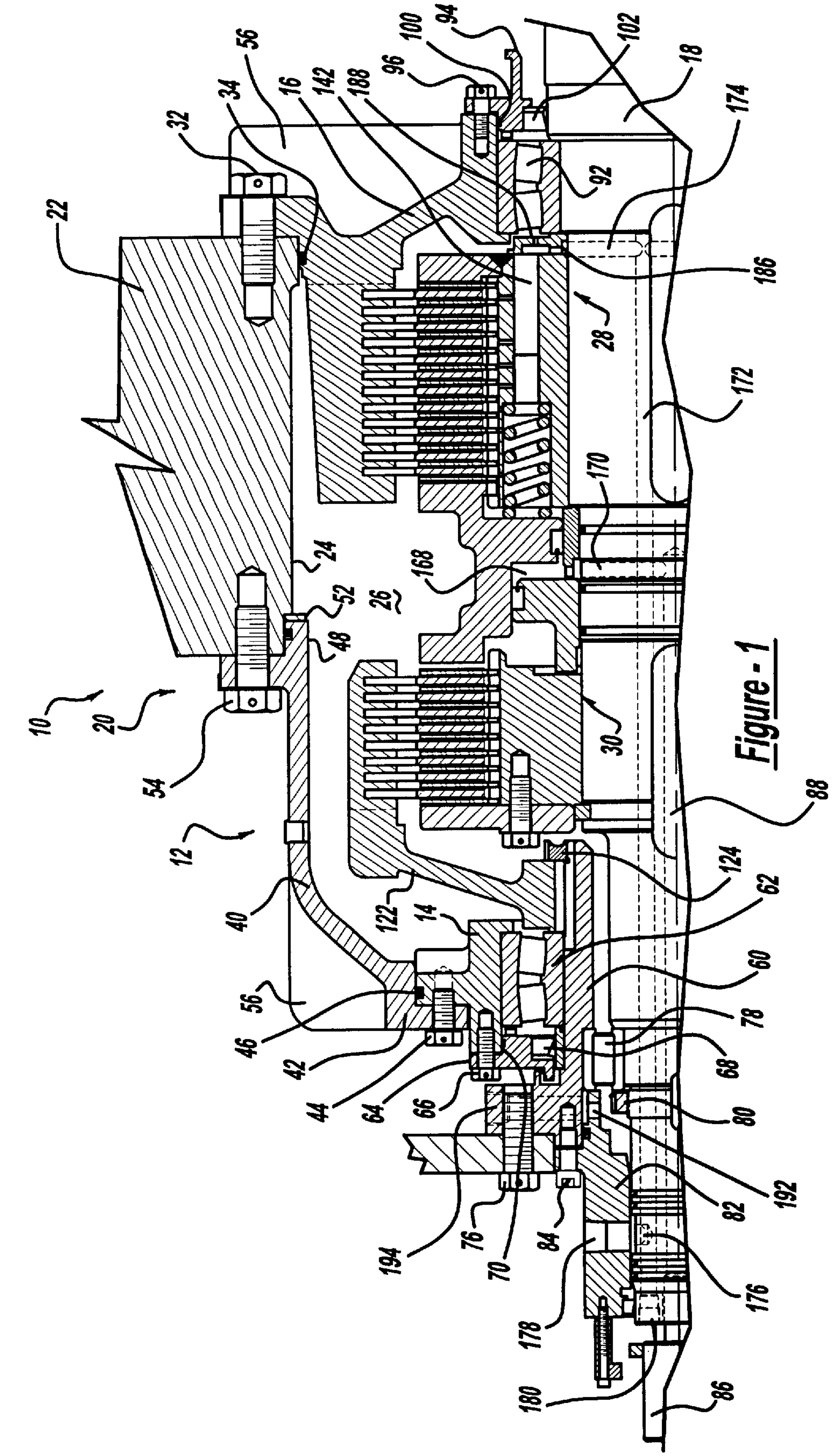
FIG. 1 is a side view, partially in cross-section, of a press drive unit in accordance with the present invention.
Figure 2:
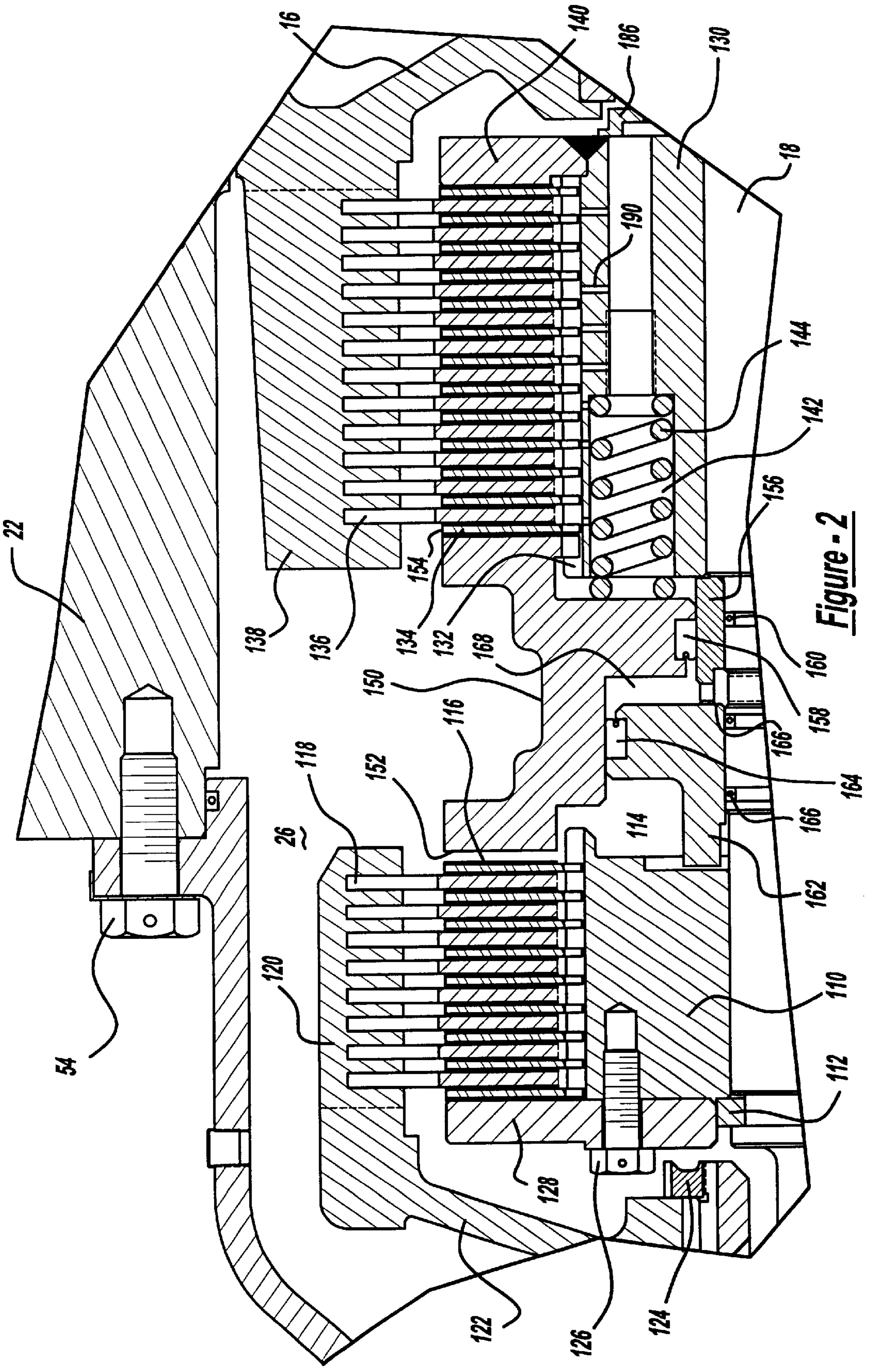
FIG. 2 is an enlarged cross-section of the clutch and brake units illustrated in FIG. 1.

Referring now to the drawing, there is shown in FIG. 1 a press drive which includes the clutch and brake units in accordance with the present invention and which is designated generally by the reference numeral 10. Press drive 10 comprises a rotatable housing assembly 12 having a pair of end wall members 14 and 16 which are spaced axially or longitudinally along a rotational drive shaft 18. Housing assembly 12 forms an outer hub assembly 20 for operatively connecting a rotatable flywheel 22 to shaft 18. Flywheel 22 defines a central axial extending bore 24 spaced radially outwardly from shaft 18 to define one wall portion of an internal cavity 26 within which are located a clutch unit 28 and a brake unit 30. One axial end of cavity 26 is closed by end wall member 16 which is fixably secured to flywheel 22 by a plurality of bolts 32 with a seal 34 being provided between a shoulder formed on end wall member 16 and a mating shoulder formed by flywheel 22. The end of cavity 26 opposite to end wall member 16 is adapted to be closed by end wall member 14 and a generally axially and radially outwardly extending enclosure member 40. Member 40 is formed with a radially inwardly extending flange section 42 which is fixedly secured to end wall member 14 by a plurality of bolts 44. A seal 46 seals the interface between members 14 and 40. The opposite end of member 40 is formed with an axial extending section 48 which is adapted to engage a recess formed in flywheel 22. A seal 52 seals the interface between member 40 and flywheel 22. Member 40 is secured to flywheel 22 using a plurality of bolts 54. Members 16 and 40 are preferably provided with a plurality of circumferentially spaced ribs or fins 56 for purposes of heat dissipation.

End wall member 14 defines a central bore within which is disposed an axially extending support member 60. A bearing 62 is disposed between end wall member 14 and support member 60. A bearing retainer 64 is secured to end wall member 14 by a plurality of bolts 66 for retaining bearing 62. A seal 68 is disposed between bearing retainer 64 and support member 60. A seal 70 seals the interface between bearing retainer 64 and end wall member 14. Thus, flywheel 22 is rotatably supported with respect to support member 60 by bearing 62 and cavity 26 is sealed by seal 68. Support member 60 defines a plurality of bores to suitably secure support member 60 to a non-rotatable structure 74 using a plurality of bolts 76. A second bearing 78 is disposed between support member 60 and drive shaft 18 to rotatably support drive shaft 18. Bearing 78 is retained on drive shaft 18 by a retainer 80 which is threadingly received on drive shaft 18. An oil supply housing 82 is secured to support member 60 by a plurality of bolts 84 and it acts as a bearing retainer for bearing 78 with respect to support housing 60. A rotary union 86 is threadingly received within a bore 88 extending into drive shaft 18 for providing pressurized hydraulic fluid to clutch unit 28 and brake unit 30 as is detailed below.

End wall member 16 defines a central opening through which drive shaft 18 extends. A bearing 92 is disposed between end wall member 16 and drive shaft 18. A first bearing retainer 94 is secured to end wall member 16 using a plurality of bolts 96. A seal 100 is disposed between end wall member 16 and retainer 94 and a seal 102 is disposed between retainer 94 and drive shaft 18 to seal cavity 26.

Briefly, in operation flywheel 22 rotates by receiving power from a plurality of V-belts or by other means known in the art. Rotation of flywheel 22 is selectively transmitted to drive shaft 18 through clutch unit 28. Normally, brake unit 30 prohibits rotation of drive shaft 18. When it is desired to power drive shaft 18 by flywheel 22, brake unit 30 is released and then clutch unit 28 is engaged. Subsequently, when it is desired to stop drive shaft 18, clutch unit 28 is disengaged and then brake unit 30 is applied.

Mounted on drive shaft 18 for rotation with drive shaft 18 within cavity 26 is an annular brake hub 110. A retaining ring 112 located within a groove in drive shaft 18 retains brake hub 110 in its axial position. The outer periphery of brake hub 110 is formed with a plurality of axially extending splines 114 which receive a plurality of brake friction discs 116. Discs 116 are allowed to move axially along splines 114 but they are prohibited from rotating with respect to splines 114 and thus discs 116 rotate with brake hub 110 and drive shaft 18.

A series of friction brake plate members 118 are interleaved with friction discs 116 and are provided with a plurality of circumferentially spaced slots for keyed engagement with a plurality of circumferentially spaced drive lugs 120 that are mounted on a support member 122 disposed coaxially with respect to drive shaft 18. Friction brake plate members 118 are allowed to move axially with respect to lugs 120 but they are prohibited from rotating with respect to lugs 120. Support member 122 is splined or keyed to support member 60 and retained in position by a retainer 124. Thus, drive lugs 120 and support member 122 provide a stationary reaction member for brake unit 30. Mounted on the end of hub 110 adjacent support member 122 by a plurality of bolts 126 is an annular radially extending abutment ring 128 that confronts friction discs 116.

Disposed axially from brake hub 110 is a clutch hub 130 which is also mounted on drive shaft 18 for rotation therewith. The outer periphery of clutch hub 130 is formed with a plurality of axially extending splines 132 which receive a plurality of clutch friction discs 134. Preferably, friction discs 134 are identical to friction discs 116. Discs 134 are allowed to move axially along splines 132 but they are prohibited from rotating with respect to splines 132 and thus discs 134 rotate with clutch hub 130 and drive shaft 18.

A series of friction clutch plate members 136 are interleaved with friction discs 134 and are provided with a plurality of circumferentially spaced slots for keyed engagement with a plurality of circumferentially spaced drive lugs 138 that are formed on an axial extension of end wall member 16. Preferably, friction clutch plate members 136 are identical to friction brake plate members 118. Friction clutch plate members 136 are allowed to move axially with respect to lugs 138 but they are prohibited from rotating with respect to lugs 138. Thus, friction clutch plate members 136 rotate with end wall member 16 and flywheel 22. Mounted at the axially outer end of clutch hub 130 is an annular, radially extending abutment ring 140 which is welded or otherwise secured to clutch hub 130. Abutment ring 140 confronts clutch friction discs 134.

Clutch hub 130 is formed with a plurality of axially extending circumferentially spaced stepped bores 142 which each receive and support a helical coil spring 144. Coil springs 144 operate to place press drive 10 in its normal configuration with brake unit 30 applied and clutch unit 28 disengaged as described below.

Disposed axially between clutch plate members 136 and brake plate members 118 is an annular piston 150. Piston 150 includes a first abutment surface 152 engageable with brake friction discs 116 and a second abutment surface 154 engageable with clutch friction discs 134. Piston 150 moves axially along a sleeve 156 which is secured to drive shaft 18. A seal 158 seals the interface between piston 150 and sleeve 156 and a seal 160 seals the interface between sleeve 156 and drive shaft 18. Piston 150 also moves axially with respect to an annular ring 162 which is also secured to drive shaft 18. A seal 164 seals the interface between annular ring 162 and piston 150 and a pair of seals 166 seal the interface between annular ring 162 and drive shaft 18. Annular ring 162 and piston 150 define a scaled fluid chamber 168 which is utilized for operating press drive 10 as described below. Coil springs 144 react against piston 150 to urge piston 150 away from clutch friction discs 134 and towards brake friction discs 116. Thus, coil springs 144 place press drive 10 in its normal position with brake unit 30 applied and clutch unit 28 is disengaged.

Drive shaft 18 is provided with a plurality of axially and radially extending bores, all of which serve a specific purpose. Bore 88 extends axially down the center line of drive shaft 18 where it mates with a radially extending bore 170. Bore 170 is open to chamber 168. As stated previously, rotary union 86 is threadingly received within bore 88. Pressurized fluid is supplied to chamber 168 through rotary union 86, bore 88 and bore 170 to operate press drive 10 as detailed below. A second axially extending bore 172 extends through drive shaft 18 to mate with a plurality of second radial bores 174. Axial bore 172 also mates with a third radial bore 176 which opens to an oil supply port 178 extending through oil supply housing 82. A plug 180 seals the axial end of bore 172. Lubricating oil is provided to cavity 26 through oil supply port 178 and bores 176, 172 and 174. Bores 174 are in communication with the plurality of stepped bores 142 within clutch hub 130. An oil guide ring 186 is positioned between clutch hub 130 and bearing 92 to direct oil into bores 142. Ring 186 also includes at least one bore 188 which directs lubricating oil towards bearing 92. The flow of lubricating oil for press drive 10 begins in oil supply port 178 and bore 176 to bore 172, to bores 174, to bores 142 through a plurality of oil ports 190 extending radially through clutch hub 130, past clutch friction discs 134 and clutch plate members 136 into cavity 26. Oil also flows from bores 174 through bore 188 and into cavity 26. The lubricating oil fills cavity 26 and it is directed through brake friction discs 116 and brake plate members 118 through an internal bore 192 defined by oil supply housing 82 and finally out a fluid passage or port 194 extending through support member 60. The lubricating oil from port 194 is cleaned and cooled before being returned to cavity 26 through oil supply port 178.

The operation of press drive 10 begins with flywheel 22 rotating on bearings 62 and 92 with drive shaft 18 being held stationary by brake unit 30. Coil springs 144 bias piston 150 towards brake unit 30 to compress the pack of brake friction discs 116 and brake plate members 118 to apply brake unit 30 and lock drive shaft 18 to stationary member 60. When it is desired to power drive shaft 18 by flywheel 22, pressurized hydraulic fluid is provided to sealed chamber 168 through rotary union 86, bore 88 and bore 170. The pressurized hydraulic fluid reacts against piston 150 to overcome the biasing of coil springs 144 and move piston 150 towards clutch unit 28. The movement of piston 150 towards clutch unit 28 first removes the compression between brake friction discs 116 and brake plate members 118 to release brake unit 30 and then it applies compressive loads to clutch friction discs 134 and clutch plate members 136 to engage clutch unit 28. The engagement of clutch unit 28 powers drive shaft 18 by flywheel 22 through discs 134 and plate members 136. Flywheel 22 will power drive shaft 18 as long as pressurized hydraulic fluid is supplied to chamber 168. When pressurized fluid is released from chamber 168, coil springs 144 move piston 150 towards brake unit 30 to disengage clutch unit 28 and apply brake unit 30 as described above. The use of hydraulic fluid or oil from press drive 10 provides the advantage of minimizing the size of chamber 168 when compared with air activated press drives. The minimizing of the size of chamber 168 also aids in lowering the inertia for press drive 10 as described above.

While the above detailed description describes the preferred embodiment of the present invention, it should be understood that the present invention is susceptible to modification, variation and alteration without deviating from the scope and fair meaning of the subjoined claims.

What is claimed is:

1. An oil shear clutch/brake unit comprising:

a stationary support member defining an oil supply port;

a rotating input member rotatably supported with respect to said stationary member;

a rotation output member rotatably supported with respect to said stationary support member and said rotating input member;

a selectively operable brake for prohibiting rotation of said output member with respect to said stationary support member, said brake including a brake hub secured to said output member;

a selectively operable clutch for prohibiting rotation of said output member with respect to said rotating input member, said clutch including a clutch hub secured to said output member, said clutch hub being positioned axially along said output member from said brake hub, said output member defining a first lubricant passage for providing lubricant directly to said selectively operable clutch from said oil supply port;

a piston disposed between said brake and said clutch, said piston being movable between a first position where said brake is applied and said clutch is disengaged and a second position where said brake is released and said clutch is engaged;

a biasing member for urging said piston into said first position; and a hydraulic fluid chamber disposed adjacent said piston, said hydraulic fluid chamber adapted to receive a pressurized hydraulic fluid to move said piston to said second position.

2. The oil shear clutch/brake unit according to claim 1, wherein said input member coaxially surrounds said output member.

3. The oil shear clutch/brake unit according to claim 2, wherein said stationary support member coaxially surrounds said output member.

4. The oil shear clutch/brake unit according to claim 3, wherein said input member coaxially surrounds said support member.

5. The oil shear clutch/brake unit according to claim 1, wherein said stationary support member coaxially surrounds said output member.

6. The oil shear clutch/brake unit according to claim 1, wherein said stationary support member coaxially surrounds said output member.

7. The oil shear clutch/brake unit according to claim 1, wherein said output member defines a fluid passage in communication with said hydraulic fluid chamber.

8. The oil shear clutch/brake unit according to claim 1, wherein said stationary support member defines a second lubricant passage for receiving fluid from said oil shear clutch/brake unit.

9. The oil shear clutch/brake unit according to claim 1, wherein said input member defines a cavity, said brake and said clutch being disposed within said cavity.

10. The oil shear clutch/brake unit according to claim 9, wherein said first lubricant passage provides lubricant to said cavity.

11. The oil shear clutch/brake unit according to claim 10, wherein said stationary support member defines a second lubricant passage for receiving lubricant from said cavity.

12. The oil shear clutch/brake unit according to claim 1 wherein said clutch hub defines an axially extending bore in fluid communication with said first lubricant passage.

13. The oil shear clutch/brake unit according to claim 12 wherein said clutch hub defines a radially extending port in communication with said axially extending bore and an outer surface of said clutch hub.

14. The oil shear clutch/brake unit according to claim 1 wherein said selectively operable brake includes a plurality of brake friction discs and said selectively operable clutch includes a plurality of clutch friction discs, said plurality of brake friction discs being the same size as said plurality of clutch friction discs.

* * * * *